US012783334B2

(12) United States Patent
Chen et al.

(10) Patent No.: US 12,783,334 B2
(45) Date of Patent: Nov. 3, 2026

(54) SYSTEMS AND METHODS FOR ADVANCED ERROR REPORTING USING MULTI-FREQUENCY SIGNALING

(71) Applicant: Dell Products L.P., Round Rock, TX (US)

(72) Inventors: Huang-Lung Chen, Kee (TW); Daniel L. Smythia, Cedar Park, TX (US); Chia-Wen Ma, New Taipei City (TW); Chia-Hao Chang, Caotun Township (TW); Chi-Hsiu Kao, New Taipei City (TW); Chung-Jung Wu, New Taipei City (TW)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 18/190,781

(22) Filed: Mar. 27, 2023

(65) Prior Publication Data

US 2024/0330091 A1 Oct. 3, 2024

(51) Int. Cl.

*G06F 11/00* (2006.01)
*G06F 3/16* (2006.01)
*G06F 9/40* (2006.01)
*G06F 9/4401* (2018.01)
*G06F 11/07* (2006.01)
*G06F 11/10* (2006.01)

(52) U.S. Cl.

CPC .......... *G06F 11/0772* (2013.01); *G06F 3/165* (2013.01); *G06F 9/4403* (2013.01); *G06F 11/0769* (2013.01)

(58) Field of Classification Search

CPC ............. G06F 11/0769; G06F 11/0772; G06F 11/0784; G06F 11/2268; G06F 11/0722

See application file for complete search history.

(56) References Cited

U.S. PATENT DOCUMENTS 5,127,007 A * 6/1992 Schranz ................ G06F 11/327 714/25
10,230,414 B1 * 3/2019 Lee ........................ H02H 9/008
2009/0177922 A1 * 7/2009 Eastman ............... G06F 11/326 714/25

OTHER PUBLICATIONS

ITU-T Recommendation Q.23 Technical Features of Push-Button Telephone Sets, Nov. 25, 1988 (Year: 1988).*

* cited by examiner

*Primary Examiner* — Philip Guyton
*Assistant Examiner* — Sean Kevin Mcnamara
(74) *Attorney, Agent, or Firm* — Jackson Walker L.L.P.

(57) ABSTRACT

An information handling system may include a processor, one or more audio speakers configured to play back audible audio signals, and a basic input/output system (BIOS) comprising a program of instructions comprising boot firmware configured to be the first code executed by the processor when the information handling system is booted or powered on in order to initialize the information handling system for operation. The BIOS may be further configured to monitor for an error occurring during execution of the BIOS and responsive to an error occurring during execution of the BIOS, cause the one or more audio speakers to play back a sequence of one or more multi-frequency audio signals encoding an identity of the error.

6 Claims, 2 Drawing Sheets

SYSTEMS AND METHODS FOR ADVANCED ERROR REPORTING USING MULTI-FREQUENCY SIGNALING

TECHNICAL FIELD

The present disclosure relates in general to information handling systems, and more particularly to error reporting in an information handling system using playback of multi-frequency signaling.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many modern information handling systems utilize a basic input/output system (BIOS). Generally speaking, a BIOS may include any system, device, or apparatus configured to identify, test, and/or initialize information handling resources of an information handling system, and/or initialize interoperation of an information handling system with other information handling systems. A BIOS may comprise boot-time services configured to be the first code executed by a processor when an information handling system is booted and/or powered on. As part of its initialization functionality, boot-time services of a BIOS may be configured to set components of an information handling system into a known state, so that one or more applications (e.g., an operating system or other application programs) stored on compatible media (e.g., disk drives) may be executed by a processor and given control of the information handling system.

Because BIOS may execute before many input/output (I/O) components of an information handling system have been initialized for operation, a BIOS may be limited in its ability to communicate or report errors occurring during BIOS execution. For example, using existing approaches, a BIOS may play via speakers of the information handling system one or more monotone “beeps” of different intervals or sequences to report errors, but it may be difficult for a user or technician to decipher such beeps, even with reference to a user manual. Accordingly, improved methods and systems for error signaling during BIOS execution may be desired.

SUMMARY

In accordance with the teachings of the present disclosure, the disadvantages and problems associated with traditional approaches to error signaling in an information handling system may be reduced or eliminated.

In accordance with embodiments of the present disclosure, an information handling system may include a processor, one or more audio speakers configured to play back audible audio signals, and a basic input/output system (BIOS) comprising a program of instructions comprising boot firmware configured to be the first code executed by the processor when the information handling system is booted or powered on in order to initialize the information handling system for operation. The BIOS may be further configured to monitor for an error occurring during execution of the BIOS and responsive to an error occurring during execution of the BIOS, cause the one or more audio speakers to play back a sequence of one or more multi-frequency audio signals encoding an identity of the error.

In accordance with these and other embodiments of the present disclosure, a method may include monitoring, by a basic input/output system (BIOS) comprising a program of instructions comprising boot firmware configured to be the first code executed by a processor when an information handling system is booted or powered on in order to initialize the information handling system for operation, for an error occurring during execution of the BIOS, and responsive to an error occurring during execution of the BIOS, causing, by the BIOS, one or more audio speakers of the information handling system to play back a sequence of one or more multi-frequency audio signals encoding an identity of the error.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: (i) monitor, by a basic input/output system (BIOS) comprising a program of instructions comprising boot firmware configured to be the first code executed by the processor when an information handling system is booted or powered on in order to initialize the information handling system for operation, for an error occurring during execution of the BIOS; and (ii) responsive to an error occurring during execution of the BIOS, cause, by the BIOS, one or more audio speakers of the information handling system to play back a sequence of one or more multi-frequency audio signals encoding an identity of the error.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
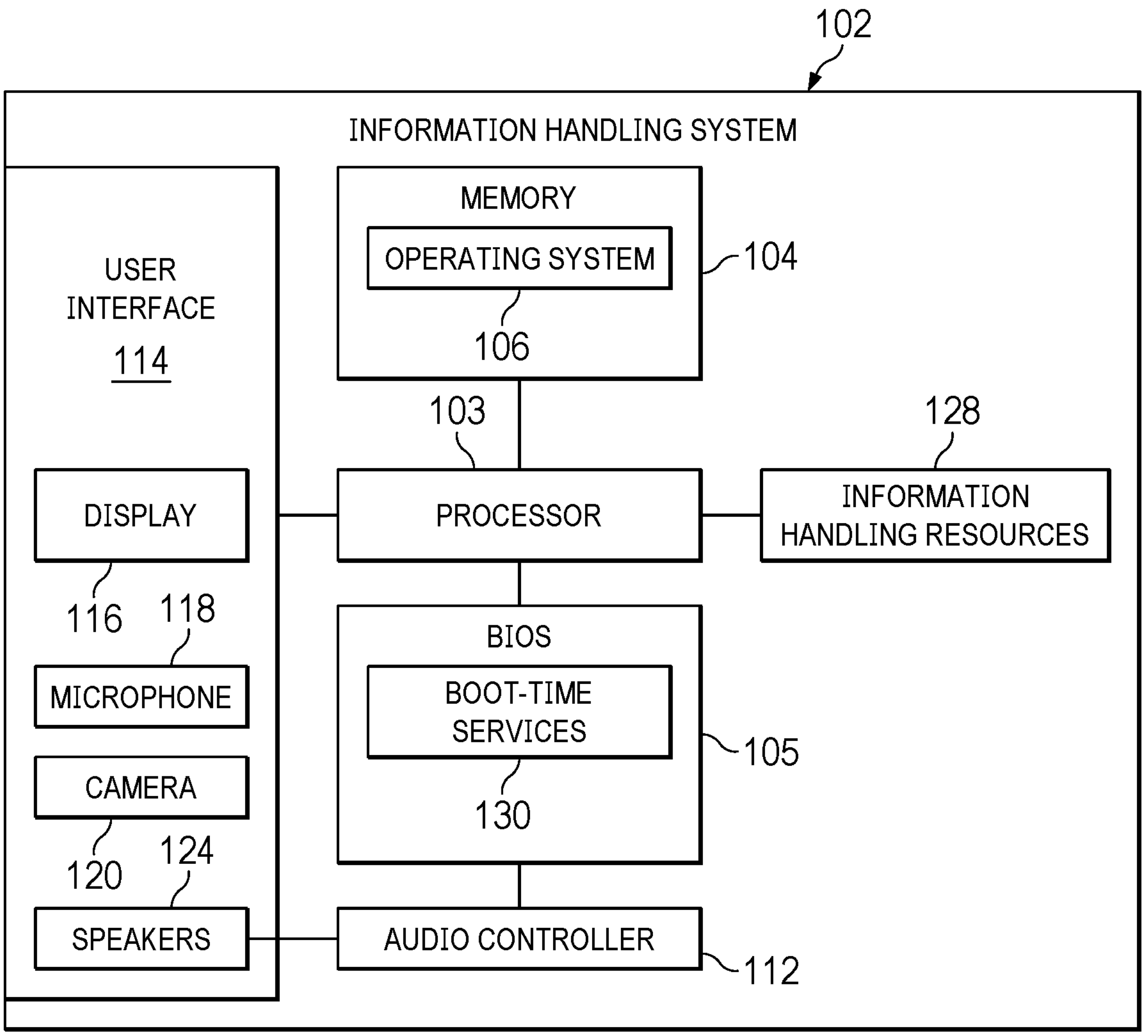
FIG. 1 illustrates a block diagram of selected components of an example information handling system, in accordance with embodiments of the present disclosure.
Figure 2:
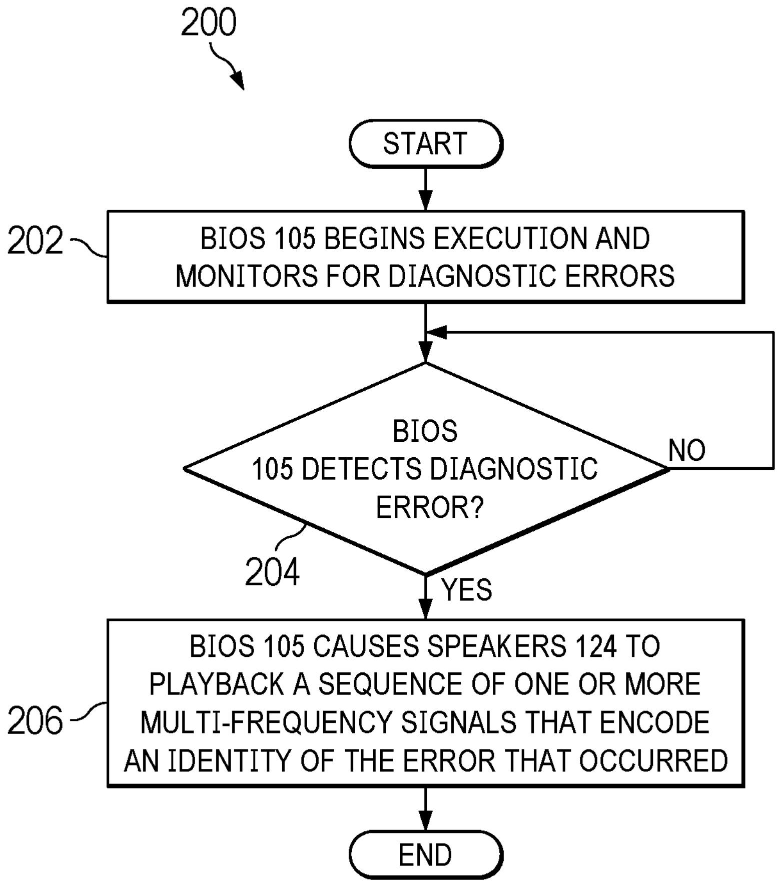
FIG. 2 illustrates a flow chart of an example method for advanced error reporting using multi-frequency signaling, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of selected components of an example information handling system 102, in accordance with embodiments of the present disclosure. In some embodiments, information handling system 102 may comprise or be an integral part of a server. In some embodiments, information handling system 102 may be a personal computer (e.g., a desktop computer or a portable computer). In other embodiments, information handling system 102 may comprise a mobile device (e.g., smart phone, a tablet computing device, a handheld computing device, a personal digital assistant, or any other device that may be readily transported on a person of a user of such mobile device).

As depicted in FIG. 1, information handling system 102 may include a processor 103, a memory 104 communicatively coupled to processor 103, an audio controller 112 communicatively coupled to processor 103, a user interface 114 communicatively coupled to processor 103, and one or more information handling resources 128 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot-time services 130 configured to be the first code executed by processor 103 when information handling system 102 is booted and/or powered on. As part of its initialization functionality, boot-time services 130 of BIOS 105 may be configured to set components of information handling system 102 into a known state, so that one or more applications (e.g., an operating system or other application programs) stored on compatible media (e.g., disk drives)

may be executed by processor 103 and given control of information handling system 102.

Audio controller 112 may comprise any system, device, or apparatus configured to interface between speakers 124 and processor 103 (including BIOS 105 and/or operating system 106 executing thereon), in order to process audio data communicated from BIOS 105 and/or operating system 106 to audio controller 112 for playback by speakers 124. For example, functionality executed by audio controller 112 may include, without limitation, buffering audio data received from operating system 106, converting audio data in digital format into equivalent analog audio data for playback by speakers 124, and/or any other functionality incident for playing back sound on speakers 124.

User interface 114 may comprise any instrumentality or aggregation of instrumentalities by which a user may interact with information handling system 102. For example, user interface 114 may permit a user to input data and/or instructions into information handling system 102 (e.g., via a keypad, keyboard, touch screen, microphone, camera, and/or other data input device), and/or otherwise manipulate information handling system 102 and its associated components. User interface 114 may also permit information handling system 102 to communicate data to a user (e.g., via a display device, speaker, and/or other data output device). As shown in FIG. 1, user interface 114 may include one or more of a display 116, microphone 118, camera 120, and two or more speakers 124.

Display 116 may comprise any suitable system, device, or apparatus configured to display human-perceptible graphical data and/or alphanumeric data to a user. For example, in some embodiments, display 116 may comprise a liquid crystal display.

Microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMS) microphone, etc.) wherein such sound is converted to an electrical signal using a diaphragm or membrane having an electrical capacitance that varies based on sonic vibrations received at the diaphragm or membrane.

Camera 120 may comprise any system, device, or apparatus configured to record images (moving or still) into one or more electrical signals that may be processed by processor 103.

A speaker 124 may comprise any system, device, or apparatus configured to produce sound in response to electrical audio signal input.

In addition to processor 103, memory 104, BIOS 105, audio controller 112, and user interface 114, information handling system 102 may include one or more other information handling resources 128. Such an information handling resource 128 may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

In operation, in response to an error occurring during execution of BIOS 105, BIOS 105 may be configured to generate one or more multi-frequency signals for playback to speakers 124 in order to identify such an error in a manner that such one or more multi-frequency signals can be received and translated by a listening device (e.g., a smartphone, tablet, handheld device, or other appropriate device). Information handling system 102 may generate multi-frequency signals in any suitable manner. For example, to generate such a multi-frequency signal, BIOS 105 may cause a first tone at a first frequency to be played back through a first speaker 124 and a second tone at a second frequency to be played back through a second speaker 124, such that the two tones combine to form a single multi-frequency signal.

In other embodiments, BIOS 105 may use a UEFI audio player driver to play back an audio file (e.g., .WAV file) with multi-frequency signals. In yet other embodiments, BIOS 105 may communicate a command to system-on-a-chip to play back the multi-frequency signals.

In some embodiments, such multi-frequency signaling may be in accordance with dual-tone multi-frequency (DTMF) signaling, which has been historically used in telecommunications signaling systems using voice-frequency band over telephone lines, in which a telephone switching center decodes multi-frequency signals to determine keys pressed by a user of a telephone. The following table shows how DTMF combines one of a set of four lower-frequency tones and one of a set of higher-frequency tones to encode a user input of telephone keys:

| | 1209 Hz | 1336 Hz | 1477 Hz | 1633 Hz |
|---|---|---|---|---|
| 697 Hz | 1 | 2 | 3 | A |
| 770 Hz | 4 | 5 | 6 | B |
| 852 Hz | 7 | 8 | 9 | C |
| 941 Hz | * | 0 | # | D |

Thus, in embodiments in which BIOS 105 uses DTMF signaling, BIOS 105 may cause speakers 124 to play a series of multi-frequency signals that encodes a sequence of one or more digits (e.g., 0-9, A-D, #, *) that uniquely identifies an error that has occurred during BIOS execution. Accordingly, a listening device (a smartphone, tablet, handheld device, other appropriate device, or an application executing on such a device) in proximity to speakers 124 and having an audio input device (e.g., a microphone) may receive the series of multi-frequency signals played back by speakers 124 and hardware, software, and/or firmware on the listening device may decode the sequence of one or more multi-frequency signals to determine an identify of the error encoded by the multi-frequency signals. Further, such listening device may generate to the user of the listening device an indication (e.g., a visual indication via a display device of the listening device) of the error that occurred and/or actions that the user may take to remedy the error. In these and other embodiments, the listening device may be configured to communicate (e.g., via a telephonic service, messaging service, or other suitable means of electronic communication) an identity of the error to a customer service center or other location, in order to enable a technician to assist the user of information handling system 102 in remedying the error.

Information handling system 102 may generate multi-frequency signals in any suitable manner. For example, in some embodiments, BIOS 105 may cause a first tone at a first frequency to be played back through a first speaker 124 and a second tone at a second frequency to be played back through a second speaker 124, such that the two tones combine to form a single multi-frequency signal.

FIG. 2 illustrates a flow chart of an example method 200 for advanced error reporting using multi-frequency signaling, in accordance with certain embodiments of the present disclosure. According to some embodiments, method 200 may begin at step 202. As noted above, teachings of the present disclosure may be implemented in a variety of configurations of information handling system 102.

At step 202, BIOS 105 may begin execution and monitor for diagnostic errors. At step 204, BIOS 105 may determine if any diagnostic error has been detected. If a diagnostic error is detected, method 200 may proceed to step 206. Otherwise, method 200 may remain at step 204 until a diagnostic error is detected.

At step 206, in response to detection of an error during execution of BIOS 105, BIOS 105 may, via audio controller 112, cause speakers 124 to play back a sequence of one or more multi-frequency signals that encode an identity of the error that occurred. Accordingly, as described above, a listening device may be used to detect such played back sequence of one or more multi-frequency signals, decode the sequence, and display and/or communicate an indication of the error that occurred. After completion of step 206, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. An information handling system comprising:

a processor;

one or more audio speakers configured to play back audible audio signals, wherein the one or more audio speakers comprise at least a first audio speaker and a second audio speaker; and a basic input/output system (BIOS) comprising a program of instructions comprising boot firmware configured to be the first code executed by the processor when the information handling system is booted or powered on in order to test and initialize the information handling system for operation, the BIOS further configured to:

monitor for a diagnostic error occurring during execution of a test included in the BIOS;

responsive to a diagnostic error occurring during execution of the test, cause the first audio speaker to play back a first sequence of audio frequency signals and the second audio speaker to, simultaneous to the first audio speaker, play back a second sequence of audio frequency signals such that the first sequence of audio frequency signals and the second sequence of audio frequency signals combine to encode a sequence of one or more telephone keypad characters that uniquely identifies a diagnostic error, wherein each signal of the first sequence of audio frequency signals is lower in frequency than each signal of the second sequence of audio frequency signals; and communicate, via a telephonic service, the first sequence of audio frequency signals and the second sequence of audio frequency signals encoding the identity of the diagnostic error to a customer service center.

2. The information handling system of claim 1, wherein the combined first sequence of audio frequency signals and second sequence of audio frequency signals encode a sequence of one or more telephone keypad characters in accordance with dual-tone multi-frequency signaling.

3. A method comprising:

monitoring, by a basic input/output system (BIOS) comprising a program of instructions comprising boot firmware configured to be the first code executed by a processor when an information handling system is booted or powered on in order to test and initialize the information handling system for operation, for a diagnostic error occurring during execution of a test included in the BIOS;

responsive to a diagnostic error occurring during execution of the test, causing, by the BIOS, a first audio speaker to play back a first sequence of audio frequency signals and a second audio speaker to, simultaneous to the first audio speaker, play back a second sequence of audio frequency signals such that the first sequence of audio frequency signals and the second sequence of audio frequency signals combine to encode a sequence of one or more telephone keypad characters that uniquely identifies a diagnostic error, wherein each signal of the first sequence of audio frequency signals is lower in frequency than each signal of the second sequence of audio frequency signals; and communicating, via a telephonic service, the first sequence of audio frequency signals and the second sequence of audio frequency signals encoding the identity of the diagnostic error to a customer service center.

4. The method of claim 3, wherein the combined first sequence of audio frequency signals and second sequence of audio frequency signals encode a sequence of one or more telephone keypad characters in accordance with dual-tone multi-frequency signaling.

5. An article of manufacture comprising:

a non-transitory computer-readable medium; and computer-executable instructions carried on the computer-readable medium, the instructions readable by a processor, the instructions, when read and executed, for causing the processor to:

monitor, by a basic input/output system (BIOS) comprising a program of instructions comprising boot firmware configured to be the first code executed by the processor when an information handling system is booted or powered on in order to test and initialize the information handling system for operation, for a diagnostic error occurring during execution of a test included in the BIOS;

responsive to a diagnostic error occurring during execution of the test, cause, by the BIOS, a first audio speaker to play back a first sequence of audio frequency signals and a second audio speaker to, simultaneous to the first audio speaker, play back a second sequence of audio frequency signals such that the first sequence of audio frequency signals and the second sequence of audio frequency signals combine to encode a sequence of one or more telephone keypad characters that uniquely identifies a diagnostic error, wherein each signal of the first sequence of audio frequency signals is lower in frequency than each signal of the second sequence of audio frequency signals; and communicate, via a telephonic service, the first sequence of audio frequency signals and the second sequence of audio frequency signals encoding the identity of the diagnostic error to a customer service center.

6. The article of claim 5, wherein the combined first sequence of audio frequency signals and second sequence of audio frequency signals encode a sequence of one or more telephone keypad characters in accordance with dual-tone multi-frequency signaling.

* * * * *